(12) United States Patent
Morales et al.

(10) Patent No.: US 7,751,087 B2
(45) Date of Patent: Jul. 6, 2010

(54) AUTOMATIC COLORIZATION OF MONOCHROMATIC PRINTED DOCUMENTS

(75) Inventors: Javier A. Morales, Rochester, NY (US); Arlene Buck, Webster, NY (US); Michael E. Farrell, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 591 days.

(21) Appl. No.: 11/695,791

(22) Filed: Apr. 3, 2007

(65) Prior Publication Data

US 2008/0246998 A1 Oct. 9, 2008

(51) Int. Cl.
  *H04N 1/40* (2006.01)
  *H04N 1/50* (2006.01)
  *G06K 9/78* (2006.01)
  *G06T 5/00* (2006.01)
  *G06T 7/00* (2006.01)

(52) U.S. Cl. ............ 358/2.1; 358/3.27; 358/1.18; 358/537; 382/162; 382/171; 382/177

(58) Field of Classification Search .......... 358/1.9, 358/2.1, 3.24, 3.27, 1.18, 530, 537, 538, 358/443, 452, 453, 462; 382/162, 168, 170, 382/171, 173, 176, 177, 200, 229, 282, 292
See application file for complete search history.

(56) References Cited

U.S. PATENT DOCUMENTS

| 4,857,955 | A | * | 8/1989 | Crandall | ............ 358/1.9 |
| 5,113,356 | A | * | 5/1992 | Nickell et al. | ............ 358/1.8 |
| 5,649,024 | A | * | 7/1997 | Goldsmith | ............ 382/176 |
| 5,659,398 | A | * | 8/1997 | Koyama et al. | ............ 358/538 |
| 5,825,943 | A | * | 10/1998 | DeVito et al. | ............ 382/177 |
| 6,032,004 | A | | 2/2000 | Mirabella, Jr. et al. | |
| 6,229,623 | B1 | * | 5/2001 | VerMurlen | ............ 358/1.9 |
| 6,453,079 | B1 | | 9/2002 | McInerny | |
| 7,355,737 | B2 | * | 4/2008 | Minowa | ............ 358/1.15 |
| 7,495,795 | B2 | * | 2/2009 | Graham et al. | ............ 358/1.18 |
| 2002/0075492 | A1 | * | 6/2002 | Lee | ............ 358/1.9 |
| 2004/0012816 | A1 | * | 1/2004 | Minowa | ............ 358/2.1 |
| 2005/0062987 | A1 | * | 3/2005 | Hashimoto et al. | ............ 358/1.9 |
| 2005/0185222 | A1 | | 8/2005 | Sammis et al. | |
| 2006/0062453 | A1 | * | 3/2006 | Schacht | ............ 382/164 |
| 2006/0171584 | A1 | | 8/2006 | Sandrew | |
| 2008/0123142 | A1 | * | 5/2008 | Minowa | ............ 358/2.1 |

FOREIGN PATENT DOCUMENTS

EP 1 351 185 8/2003

* cited by examiner

*Primary Examiner*—Scott A Rogers
(74) *Attorney, Agent, or Firm*—Gibb I.P. Law Firm, LLC

(57) ABSTRACT

Embodiments herein include a method of adding color to a monochrome (single color printing) document that begins by inputting/creating colorization rules relating to the previously printed monochromatic document and scanning the previously printed monochromatic document to locate rasterized data. After the scanning, the method performs optical character recognition on the rasterized data to search for text corresponding to the previously printed monochromatic document. After the rules are input and the rasterized data is produced, the method automatically colorizes portions of rasterized content according to the colorization rules and this generates a colorized electronic document.

12 Claims, 2 Drawing Sheets

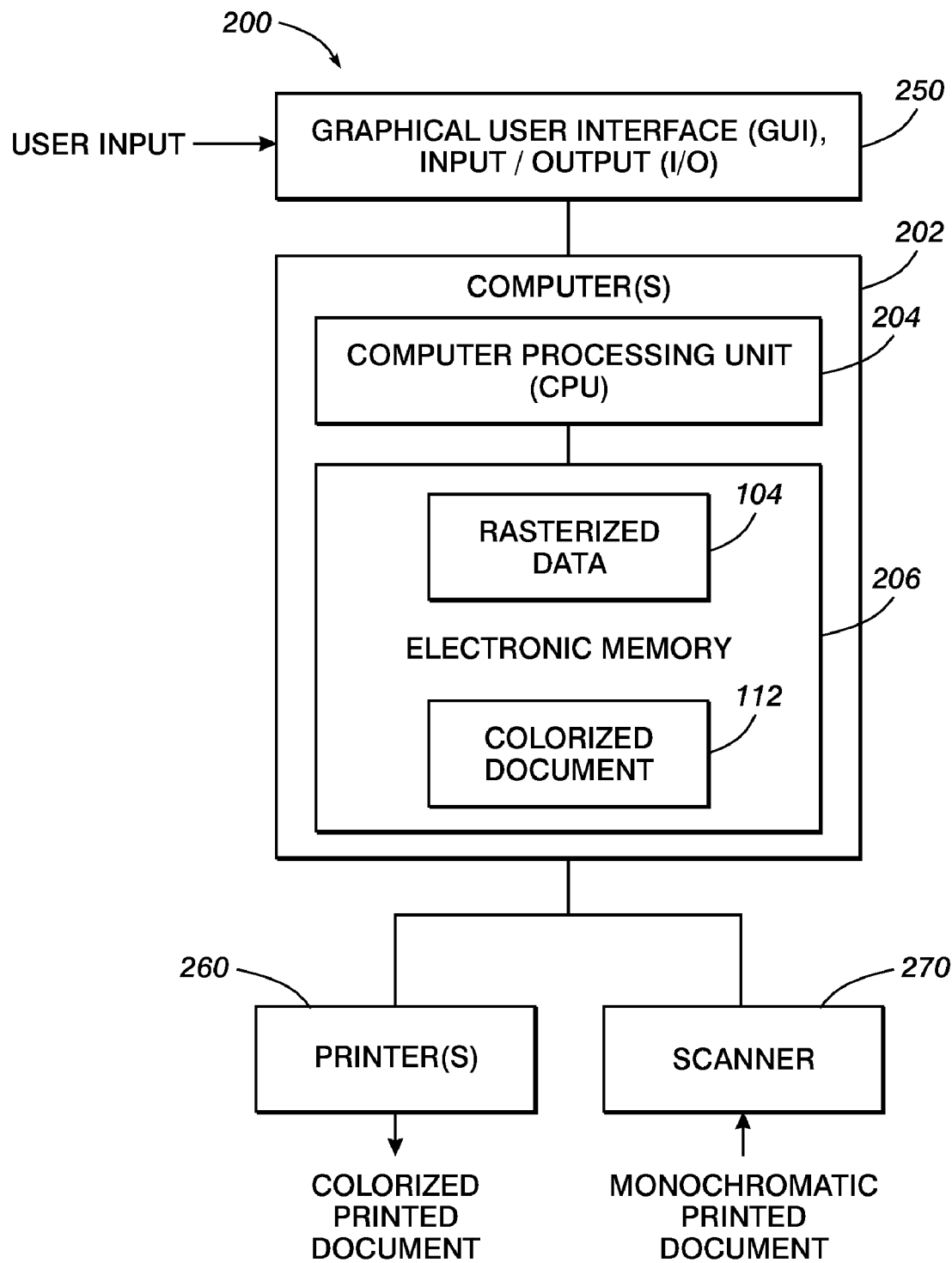

AUTOMATIC COLORIZATION OF MONOCHROMATIC PRINTED DOCUMENTS

BACKGROUND

Embodiments herein generally relate to systems that colorize documents and more particularly to a method of adding color to a monochrome (single color printing) printed document that applies pre-established rules to automatically colorizes portions of the monochromatic document.

The concept of colorization of documents and film has been addressed before; however, prior colorization solutions rely upon manual processes to identify the regions that require the added color. For example, U.S. Patent Publication 2006/0171584 (the complete disclosure of which is incorporated herein by reference) deals with a manually intensive process of colorizing motion picture scenes. Similarly, U.S. Patent Publication 2004/0012816 (the complete disclosure of which is incorporated herein by reference) discloses a system for printing in two or more colors based on print data for monochrome printing which uses a colorization setup device that presents a data entry screen containing input fields for entering colorization information for each of a plurality of specific items. In such systems, the user is required to manually identify the items in films and documents that are to have color added.

Adding a highlight color to monochrome documents is one of the ways in which print shops can add value to their customer's existing monochrome documents. With conventional systems, in order to colorize monochrome print jobs, each print job is opened in an editor and individual objects are colorized one at a time. This process makes the migration to highlight color cost-prohibitive in the majority of cases. Further, such systems concentrate on cases in which the source document is a scanned document that is not in the portable document language (PDL) format and does not have properties of discreet objects defined, and such systems do not work well with electronic formats, where the properties of discreet objects can be discerned by inspecting the PDL file.

SUMMARY

The embodiments herein provide a series of methods, a computer program, a service, and a system for applying user-defined rules to automatically colorize monochrome documents. Depending on the contents of the document to be colorized, the rules could be based on position, object properties or other user-defined criteria. Once the rules are specified, the system will evaluate them against objects in a given document and apply the specified colorization.

More specifically, embodiments herein include a method of adding color to a monochrome (single color printing) printed document. One method begins by inputting/creating colorization rules relating to the previously printed monochromatic document and scanning the previously printed monochromatic document to look for rasterized data. After the scanning, the method performs optical character recognition on the rasterized data to produce text corresponding to the previously printed raster content. The foregoing can be performed in any order; however, at some point after the rules are input and the text data is produced, the method automatically colorizes portions of rasterized content within the monochromatic electronic document according to the colorization rules and this generates a colorized electronic document. Next, because the data obtained from the optical character recognition was needed only temporarily, after colorization, the method deletes the optical character recognition data.

There can be many different colorization rules that are applied to the embodiments herein. For example, the colorization rules can comprise a rule that automatically colorizes all raster data relating to text of a selected font type. It should be noted that, for purposes herein, the "font type" can refer to a type of metadata that is not typically associated with a font. For example, Helvetica, Arial, Gil Sans are fonts of the type Sans Serif, and Times, Berkeley and Bookman are fonts of the type Serif. Embodiments herein maintain this information in storage and use this information to classify the font into a specific type and then colorize the classified types of fonts. These properties, along with more traditional font properties may be used in conjunction with the OCR to determine which document text should be colorized. Also note that the font metadata (e.g. Serif, Sans Serif classification) may be used with or without OCR. Alternatively (or in conjunction with the foregoing) the colorization rules can comprise rules that determine all font types occurring within the monochromatic electronic document, determine which font types occur with a predetermined frequency in the monochromatic electronic document, and automatically colorize raster data relating to text having the font type that occurs with at least the predetermined frequency. Similarly, the colorization rules can comprise rules that determine all font types occurring within the monochromatic electronic document, determine a frequency at which different font types occur in the monochromatic electronic document, and automatically colorize raster data relating to text having a font that occurs least frequently in the monochromatic electronic document.

Also, the colorization rules can comprise a rule that automatically colorizes raster data relating to all occurrences of a specified text string. Further, the colorization rules can comprise a rule that automatically colorizes all raster data relating to text occurring within a pre-defined region of each page of the previously printed monochromatic document.

In another embodiment, a method is provided that also inputs/creates colorization rules; however, these colorization rules comprise a rule that automatically colorizes a predetermined raster image, such as a logo, etc. In a similar manner to that described above, the previously printed monochromatic document is scanned to produce the rasterized data; however, this rasterized data does not need to be subjected to optical character recognition processes. Instead, the method searches the rasterized data to locate occurrences of the predetermined raster image, and automatically colorizes the occurrences of the predetermined raster image to produce a colorized electronic document. Then, the method can print the colorized electronic document with each occurrence of the logo being printed in color.

In other variations, the colorization rules can further comprise a rule that only colorizes the occurrences of the predetermined raster image that occur within a pre-defined region of each page of the rasterized data. Similarly, the colorization rules further can comprise a rule that automatically colorizes all rasterized images occurring within a pre-defined region of each page of the previously printed monochromatic document in addition to colorizing the occurrences of the predetermined raster image.

Further embodiments can include colorization rules that automatically identify recurring raster images within the rasterized data, and automatically colorize the ones of the recurring raster images that recur with at least a predetermined frequency. Also, the colorization rules can further comprise rules that automatically identify recurring raster images within the rasterized data, provide the recurring raster images to a user for selection, and automatically colorize ones of the recurring raster images as selected by the user. Similarly, colorization of rectangles containing knockout text (these are typically used as section headers or title bars) is provided with embodiments herein to colorize boxes (black or gray) that contain white text.

Another embodiment comprises a system that includes a graphic user interface adapted to receive the colorization rules that relate to the previously printed monochromatic document. The system also includes a scanner operatively connected to the graphic user interface. The scanner is adapted to scan the previously printed monochromatic document to locate rasterized data. A memory is provided in the system operatively connected to the scanner. The memory is adapted to store the rasterized data.

The system embodiment has a central processing unit operatively connected to the memory and that is adapted to execute an optical character recognition program on the rasterized data to produce the text corresponding to the previously printed monochromatic document. The central processing unit is further adapted to automatically colorize portions of rasterized content within the monochromatic electronic document according to the colorization rules to generate a colorized electronic document, which can be output as electronic documents, or printed. In some embodiments, a printer is included operatively connected to the central processing unit if the colorized document is to be printed. The central processing unit is adapted to delete the optical character recognition after the central processing unit outputs the colorized electronic document.

These and other features are described in, or are apparent from, the following detailed description.

BRIEF DESCRIPTION OF THE DRAWINGS

Various exemplary embodiments of the systems and methods are described in detail below, with reference to the attached drawing figures, in which:

FIG. 2 is a schematic representation of a system according to embodiment herein.

DETAILED DESCRIPTION

Figure 1:
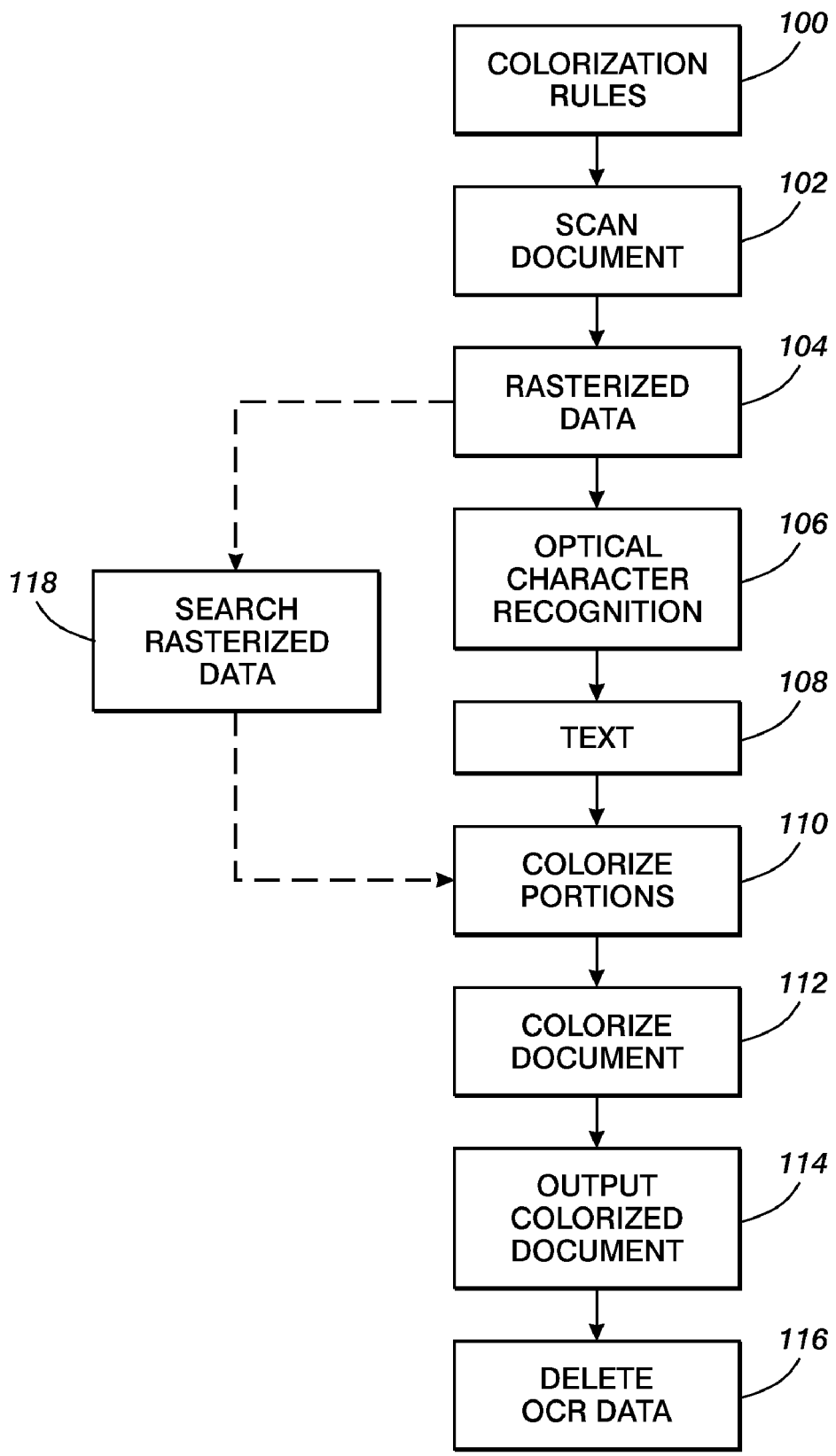
FIG. 1 is a flow diagram illustrating an embodiment herein.

The embodiments herein provide processes, systems, services, computer programs, etc. to allow colorization of monochromatic scanned documents. The following methods for selective colorization of content are generally applied by the embodiments herein, as explained in greater detail below.

In one situation, the embodiments herein apply optical character recognition (OCR) algorithms to scanned pages to derive text, text properties and coordinates and then color the text, based on colorization rules. For example, the embodiments herein receive raster input from a scanner and perform OCR to determine which areas of the input document contain text and to determine the properties of that text. Since the system is using OCR to find text areas in the document, the user is allowed to specify colorization rules, such as those concerning the type of font in a document (e.g. Serif, Sans Serif, Display type, etc.) that is not to receive colorization. In this example, the user can specify rules about colorization of text based on properties such as font size, style, etc. The text properties are then evaluated against the colorization rules. If the system finds text that should be colorized pursuant to the rules, the system applies that colorization to the source raster content that matches the found text, without requiring specific identification of each item of text by the user. Thus, the embodiments herein do not actually colorize the text, but rather the embodiments here use the text to identify the areas of content in the raster document that should be colorized. The identified text will be at specific coordinates in the layout and that is the information that the embodiments here use to find content in the raster that should be colorized. The text itself is discarded after colorization. This type of content matching can be used to find Chapter/Section titles that should be colorized, among other uses.

In another situation, the embodiments herein use pattern matching to identify instances of a given image and to color the given image throughout a document. This feature can, for example, match logo images, etc. (e.g., rasterized graphics). In this case, the user identifies an area of the document containing the rasterized graphics that are to be colorized in subsequent pages and potentially in many different documents. Once this area is identified, the system stores the raster data within this area as a separate image in a persistent location. When other documents are submitted to the colorization process, the system looks through all pages for raster patterns that match the images that were previously identified. The matching images elsewhere in the document (or those found in other documents) are then automatically colorized, without requiring the user to manually color each occurrence of the graphical image. This type of content matching can be used to find logos and other graphical elements (bullet symbols, horizontal rules, vertical rules) that should be colorized in a collection of documents such as technical manuals or training material, for example.

In other situations, embodiments herein use content matching to identify instances of a given text string throughout a document. In this case, the user specifies rules about colorization of specific text strings throughout the document. The system receives the raster input and performs OCR to determine which areas of the input document contain the specified text. The specified text is then colorized, without the user having to select each instance of the text or having to perform a search and replace operation. Thus, with embodiments herein, if the system finds text that should be colorized per the rules, the system applies that colorization to the source raster content that matches the found text. The electronically stored text itself is discarded after colorization. This type of content matching can be used to find keywords that should be colorized throughout a document, for example.

Colorization of spatial regions of pages, typically headers or footers can also be accomplished with embodiments herein. To colorize footers or page numbers, the user would specify the area (e.g., bottom 1 inch) of the page as the region for colorization. Similarly, colorization of rectangles containing knockout text (these are typically used as section headers or title bars) is provided with embodiments herein to colorize boxes (black or gray) that contain white text. Although some embodiments herein are described in the context of a single document, as would be understood by one ordinarily skilled in the art, any embodiment herein can be implemented as part of a workflow system that automatically applies the colorization rules to a variety of different documents.

Thus, as described in greater detail below, embodiments herein provide for the transient use of OCR to identify parts of a raster document that should be colorized, use non-specific text characteristics (e.g. Sans Serif text) for colorization, use a source image to find and colorize content within a raster document, use specific text strings to find and colorize content within a raster document, perform colorization of specific geometric areas of a page, perform colorization of objects containing knockout text, as well as many other useful functions.

As illustrated in flowchart form in FIG. 1, embodiments herein include a method of adding color to a monochrome (single color printing) printed document. In item 100, one embodiment begins by inputting/creating colorization rules relating to the previously printed monochromatic document. In item 102, the previously printed monochromatic document is scanned to search for and produce rasterized data 104. After the scanning, the method performs optical character recognition on the rasterized data in item 106 to search for text 108 corresponding to the previously printed monochromatic document, which can be temporarily stored in the form of a monochromatic electronic text document, for example.

The foregoing can be performed in any order; however, at some point after the rules 100 are input and the rasterized data 104 is produced, the method automatically colorizes portions of rasterized content (e.g., text) within the monochromatic electronic document according to the colorization rules in item 110 and this generates a colorized electronic document 112. Next, the method outputs (which can include printing) the colorized electronic document in item 114 and, because the data obtained from the optical character recognition was needed only temporarily, after colorization, the method deletes the optical character recognition data in item 116.

There can be many different colorization rules 100 that are applied to the embodiments herein. For example, the colorization rules 100 can comprise a rule that automatically colorizes all raster data relating to text of a selected font type. Alternatively, (or in conjunction with the foregoing) the colorization rules 100 can comprise rules that determine all font types occurring within the text, determine which font types occur with a predetermined frequency in the text, and automatically colorize raster data relating to text having the font type that occurs with at least the predetermined frequency. Similarly, the colorization rules 100 can comprise rules 100 that determine all font types occurring within the text, determine a frequency at which different font types occur in the text, and automatically colorize raster data relating to text having a font that occurs least frequently in the text.

Also, the colorization rules 100 can comprise a rule that automatically colorizes raster data relating to all occurrences of a specified text string. Further, the colorization rules 100 can comprise a rule that automatically colorizes all raster data relating to text occurring within a pre-defined region of each page of the previously printed monochromatic document.

In another embodiment, a method is provided that also inputs/creates colorization rules 100. These colorization rules 100 comprise a rule that automatically colorizes a predetermined raster image, such as a logo, etc. In a similar manner to that described above, the previously printed monochromatic document is scanned 102 to produce the rasterized data; however, this rasterized data does not need to be subjected to optical character recognition processes 106. Instead, the method bypasses items 106 and 108 (as shown by the dashed line in FIG. 1) and searches the rasterized data in item 118 to locate occurrences of the predetermined raster image, and then automatically colorizes the occurrences of the predetermined raster image in item 110 to produce the colorized electronic document 112. Then, the method can output (114) the colorized electronic document with each occurrence of the logo being printed in color by outputting the colorized electronic document in electronic form or by printing the colorized document.

In other variations, the colorization rules 100 can further comprise a rule that only colorizes the occurrences of the predetermined raster image that occur within a pre-defined region of each page of the rasterized data. Similarly, the colorization rules 100 further can comprise a rule that automatically colorizes all rasterized images occurring within a pre-defined region of each page of the previously printed monochromatic document in addition to the colorizing of the occurrences of the predetermined raster image.

Further embodiments can include colorization rules 100 that automatically identify recurring raster images within the rasterized data, and automatically colorize the ones of the recurring raster images that recur with at least a predetermined frequency. Also, the colorization rules 100 can further comprise rules 100 that automatically identify recurring raster images within the rasterized data, provide the recurring raster images to a user for selection, and automatically colorize ones of the recurring raster images as selected by the user.

Another embodiment, shown in FIG. 2, comprises a system 200 that includes a central processing unit 204 (within a computer 202) and graphic user interface 250 adapted to receive the colorization rules 100 that relate to the previously printed monochromatic document. The system 200 also includes a scanner 270 operatively connected to the graphic user interface 250 through the computer 202 and central processing unit 202. The scanner 270 is adapted to scan the previously printed monochromatic document to find the rasterized data 104. A memory 206 is provided in the system 200 operatively connected to the scanner 270 to store the rasterized data 104 and the colorized document 112.

Computers that include input/output devices, memories, processors, etc. are readily available devices produced by manufactures such as International Business Machines Corporation, Armonk N.Y., USA and Apple Computer Co., Cupertino Calif., USA. Such computers commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Stamford, Conn., USA and Visioneer, Inc. Pleasanton, Calif., USA and the details of such devices are not discussed herein for purposes of brevity and reader focus.

The central processing unit 204 is operatively connected to the memory 206 and is adapted to execute an optical character recognition program on the rasterized data to produce the text corresponding to the previously printed monochromatic document. Optical character recognition programs and systems are readily available items produced by manufactures such as Nuance Communications, Inc., Burlington, Mass., USA, and Adobe Systems Incorporated, San Jose, Calif., USA. The details of optical character recognition are omitted herefrom to allow the reader to focus on the salient aspects of the embodiments described herein. The central processing unit is further adapted to automatically colorize portions of rasterized content 110 according to the colorization rules to generate the colorized electronic document 112, as described above.

A printer 260 is included operatively connected to the central processing unit 204 and computer 202 and is adapted to print the colorized electronic document 112 out as a colorized printed document. The embodiments herein can be used with any conventional device that has the ability to print in multiple colors. One exemplary hardware system that efficiently prints in more than one color is disclosed in U.S. Patent Publication 2005/0185222 (the complete disclosure of which is incorporated herein by reference). The system disclosed in U.S. Patent Publication 2005/0185222 provides a solution for customers needing to add color to their documents when it makes economical sense to print the majority of black and white pages on a monochrome printer at a fraction of the cost of a color printer. In such a system customers add tracking data (such as account #, page in set) to each sheet in job. A print manger is the traffic director that promotes the print job processing from analysis, using a PostScript interpreter, to separating the color and black and white sheets, using a splitter, to sending and monitoring the print requests at the printers. The color portion is printed on a color printer. The printed color portion is loaded into an interposer. The operator requests final printing using a graphic user interface where the monochrome portion of the job is merged with the color portion.

The word "printer" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. Printers are readily available devices produced by manufactures such as Xerox Corporation, Stamford, Conn., USA and Hewlett Packard Company, Palo Alto Calif., USA. Such printers commonly include input/output, power supplies, processors, media movement devices, marking devices etc., the details of which are omitted herefrom to allow the reader to focus on the salient aspects of the embodiments described herein.

As used herein, the printed document comprises a tangible object that includes markings (text) on physical sheets (printing media) that are capable of being read and/or recognized by humans. The printed publication is contrasted with an electronic document that is stored on some form of electronic media (as charges, etc.) that can be read by only by a machine and that must be converted into human readable text by the machine and displayed to the user by the machine on some form of electronic display device. The printed publication can comprise any type of physical hard copy item including a book, pamphlet, newspaper, magazine, etc. The central processing unit 204 is further adapted to delete the optical character recognition data after the central processing unit 204 outputs (or the printer 260 prints) the colorized electronic document 112.

All foregoing embodiments are specifically applicable to electrostatographic and/or xerographic machines and/or processes as well as to software programs stored on the electronic memory (computer usable data carrier) 206 and to services whereby the foregoing methods are provided to others for a service fee. It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A computer-implemented method comprising:
   using a computer, inputting colorization rules;
   using said computer, scanning a previously printed monochromatic document to locate rasterized data;
   using said computer, performing optical character recognition on said rasterized data to produce text;
   using said computer, automatically colorizing portions of said rasterized data according to said colorization rules to generate a colorized electronic document; and
   using said computer, outputting said colorized electronic document;
   wherein said colorization rules comprise rules that:
      determine all font types occurring within said text;
      determine which font types occur with a predetermined frequency in said text; and
      automatically colorize raster data relating to text having said font type that occurs with at least said predetermined frequency.

2. The method according to claim 1, wherein said colorization rules comprise a rule that automatically colorizes all raster data relating to text of a selected font type.

3. The method according to claim 1, wherein said colorization rules comprise a rule that automatically colorizes raster data relating to all occurrences of a specified text string.

4. A computer-implemented method comprising:
   using a computer, inputting colorization rules, wherein said colorization rules comprise a rule that automatically colorizes all raster data relating to text occurring within a pre-defined region of each page of a previously printed monochromatic document;
   using said computer, scanning said previously printed monochromatic document to locate rasterized data;
   using a computer, performing optical character recognition on said rasterized data to produce text;
   using a computer, automatically colorizing portions of said rasterized data according to said colorization rules to generate a colorized electronic document; and
   using a computer, outputting said colorized electronic document;
   and wherein said colorization rules further comprise rules that:
      determine all font types occurring within said text;
      determine a frequency at which different font types occur in said text; and
      automatically colorize raster data relating to text having a font that occurs least frequently in said text.

5. The method according to claim 4, wherein said colorization rules further comprise a rule that automatically colorizes all raster data relating to text of a selected font type.

6. The method according to claim 4, wherein said colorization rules further comprise a rule that automatically colorizes raster data relating to all occurrences of a specified text string.

7. A method comprising:
   inputting colorization rules, wherein said colorization rules comprise a rule that automatically colorizes a predetermined raster image;
   scanning a previously printed monochromatic document to locate rasterized data;
   searching said rasterized data to locate occurrences of said predetermined raster image;
   automatically colorizing said occurrences of said predetermined raster image to produce a colorized electronic document; and
   outputting said colorized electronic document;
   and wherein said colorization rules further comprise rules that:
      automatically identify recurring raster images within said rasterized data;
      provide said recurring raster images to a user for selection; and
      automatically colorize ones of said recurring raster images as selected by said user.

8. The method according to claim 7, wherein said colorization rules further comprise a rule that only colorizes said occurrences of said predetermined raster image that occur within a pre-defined region of each page of said previously printed monochromatic document.

9. The method according to claim 7, wherein said colorization rules further comprise a rule that automatically colorizes all rasterized images occurring within a pre-defined region of each page of said previously printed monochromatic document in addition to said colorizing of said occurrences of said predetermined raster image.

10. A system comprising:
a graphic user interface adapted to receive colorization rules relating to a previously printed monochromatic document;
a scanner operatively connected to said graphic user interface and being adapted to scan said previously printed monochromatic document to locate rasterized data;
memory operatively connected to said scanner and being adapted to store said rasterized data;
a central processing unit operatively connected to said memory and being adapted to execute an optical character recognition program on said rasterized data to search for text corresponding to said previously printed monochromatic document, wherein said central processing unit is further adapted to automatically colorize portions of said rasterized data according to said colorization rules to generate a colorized electronic document; and
a printer operatively connected to said central processing unit and being adapted to print said colorized electronic document,
wherein said colorization rules comprise rules that:
determine all font types occurring within said text;
determine a frequency at which different font types occur in said text; and
automatically colorize raster data relating to text having a font that occurs least frequently in said text.

11. The system according to claim 10, wherein said colorization rules comprise a rule that automatically colorizes all raster data relating to text of a selected font type.

12. A computer program product comprising:
a computer-usable data carrier storing instructions that, when executed by a computer, cause the computer to perform a method comprising:
inputting colorization rules;
scanning a previously printed monochromatic document comprising raster content to locate rasterized data;
performing optical character recognition on said rasterized data to produce text corresponding to said raster content;
automatically colorizing portions of said rasterized data according to said colorization rules to generate a colorized electronic document; and
outputting said colorized electronic document;
wherein said colorization rules comprise rules that:
determine all font types occurring within said text;
determine which font types occur with a predetermined frequency in said text; and
automatically colorize raster data relating to text having said font type that occurs with at least said predetermined frequency.

\* \* \* \* \*